Figure 1:
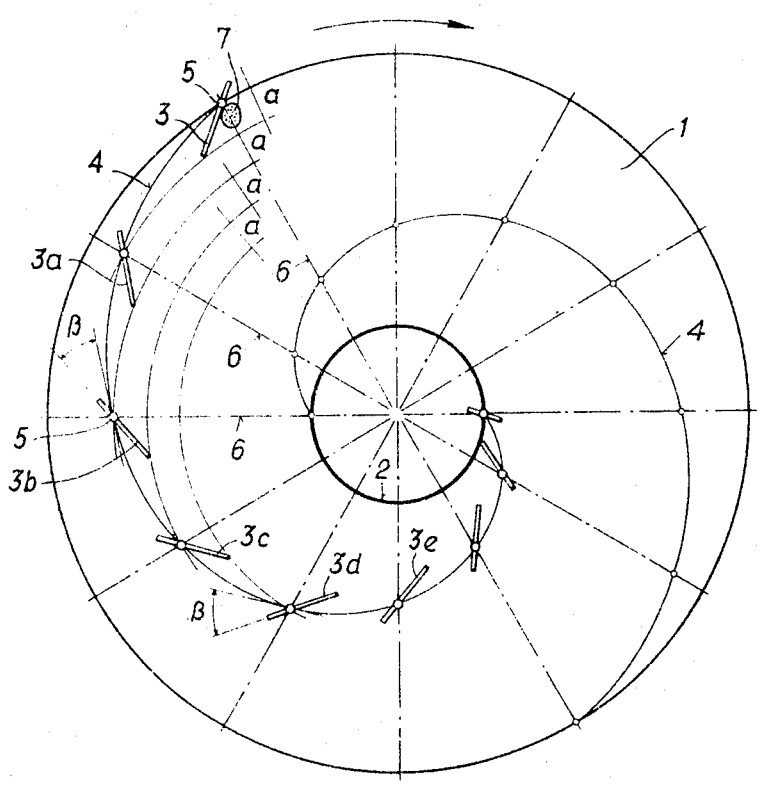

United States Patent
Pink et al.

[15] 3,662,896
[45] May 16, 1972

[54] APPARATUS FOR DRAINING LIQUID FROM A SUSPENSION

[72] Inventors: Peter Pink, Klein Rotz near B. Korneuburg; Rupert Dallner, Vienna, both of Austria

[73] Assignee: Chemie Und Metall Gesellschaft M.B.H. Rheax, Vienna, Austria

[22] Filed: June 17, 1970

[21] Appl. No.: 46,918

[30] Foreign Application Priority Data

June 19, 1969 Austria....................................5804/69

[52] U.S. Cl..............................210/525, 210/531, 210/521, 210/534
[51] Int. Cl.........................................................B01d 12/00
[58] Field of Search..........................210/515, 521, 522, 534

[56] References Cited

UNITED STATES PATENTS

| | | | |
|---|---|---|---|
| 1,357,587 | 11/1920 | Peck | 210/525 X |
| 2,253,500 | 8/1941 | Arahgo | 210/522 |
| 3,067,878 | 12/1962 | Genter et al. | 210/521 X |
| 3,191,775 | 6/1965 | Schepman | 210/534 X |
| 3,245,543 | 4/1966 | Levendusky et al. | 210/521 |
| 1,135,997 | 4/1915 | Dorr | 210/521 X |
| 2,536,729 | 1/1951 | Diaz-Compain | 210/522 |

*Primary Examiner*—Frank W. Miga
*Attorney*—Kurt Kelman

[57] ABSTRACT

Water is drained from sand by moving the slurry upwardly along a conical support surface by a plurality of entrainment shovels which are arranged in a spiral and are rotated over the surface. While successive shovels move ever drier portions of the sand upwardly along the surface to a discharge opening at the apex of the conical support surface, the water runs down the surface.

10 Claims, 3 Drawing Figures

INVENTORS
PETER PINK
RUPERT DALLNER

BY Kurt Kelman
AGENT

INVENTORS
PETER PINK
RUPERT DALLNER

BY Kurt Kelman

APPARATUS FOR DRAINING LIQUID FROM A SUSPENSION

The present invention relates to improvements in apparatus for draining liquid, such as water, from a suspension of solid particles, such as sand, in the liquid. In addition to the solid particles, which are to be recovered, the suspension may contain additional solid particles suspended therein, such as clay particles suspended in a sand slurry.

Draining slurries of their liquid component is often of importance. In the construction industry, for instance, undesired particles, such as clay, must be removed by washing the sand with water, during which process the clay particles are suspended in the resultant slurry. Before the sand can be used, the wash water and the suspended clay particles must be removed. It has been proposed to use draining apparatus for this purpose which makes use of the principle that, when the slurry is slowly moved upwardly along a rising support surface, the liquid phase will be separated from the solid phase, the liquid phase running down the surface and taking along any light suspended particles, while the solid phase will become gradually drier and purer as it moves upwardly. At the end, the relatively dry and pure solid particles may be recovered. Known draining apparatus of this type has made use of screw conveyors for the slurry, and the machines have been very large and cumbersome.

It is the primary object of this invention to provide improved apparatus for draining liquid from a slurry, which also makes use of an inclined plane but is much simpler and more compact.

This and other objects of the invention are accomplished with an apparatus wherein a substantially conical support surface for a suspension of solid particles in a liquid rises from a reservoir containing the suspension. A plurality of entrainment elements are arranged along at least one spiral and associated with the conical support surface. A first entrainment element extends into the reservoir for entraining the suspension. Means is provided for imparting rotation between the plurality of entrainment elements and the conical support surface whereby the solid particles of the suspension are entrained upwardly from the reservoir by a succession of the entrainment elements along the spiral or spirals while the liquid runs downwardly over the support surface. An output opening at an upper end of the spiral receives and discharges the solid particles from the conical support surface.

In a preferred embodiment, a corresponding plurality of radially extending carrier arms support the plurality of entrainment elements, which may be shovel-like blades. The carrier arms may be so wide that adjacent arms touch each other and the carrier structure may thus become a disc.

Arranging the entrainment means along one or more spirals has the advantage that the slurry is slowly moved upwardly along the inclined plane in small increments but that the number of entrainment means may be rather large, which increases the output of the apparatus considerably while keeping down its dimension.

It is preferred to mount the entrainment elements for adjustment about an axis substantially perpendicular to the conical support surface whereby it is possible to adapt the apparatus to different slurries of varying solid concentration and/or particle sizes. For the same reason, it is also advantageous to make the entrainment elements adjustable in respect of the support surface, i.e. to adjust them into contacting or gliding engagement with the surface or to leave a gap of varying size therebetween.

Throughout the specification and claims, the term "substantially conical support surface" includes any surface resembling that of a cone or frusto-cone which is generated by a rectilinear as well as a concavely curved line. As a matter of fact, a generatrix whose steepness increases towards the axis of rotation and which produces a somewhat bell-shaped surface may improve the separation of the liquid from the solid phase of the slurry moved upwardly thereover.

Figure 2:
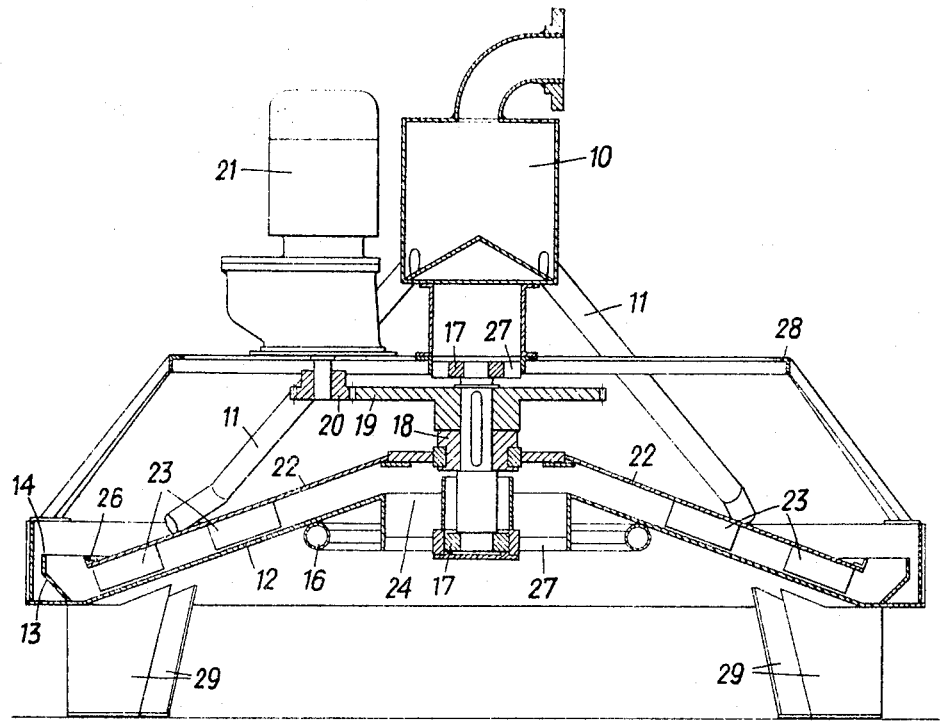
Figure 3:
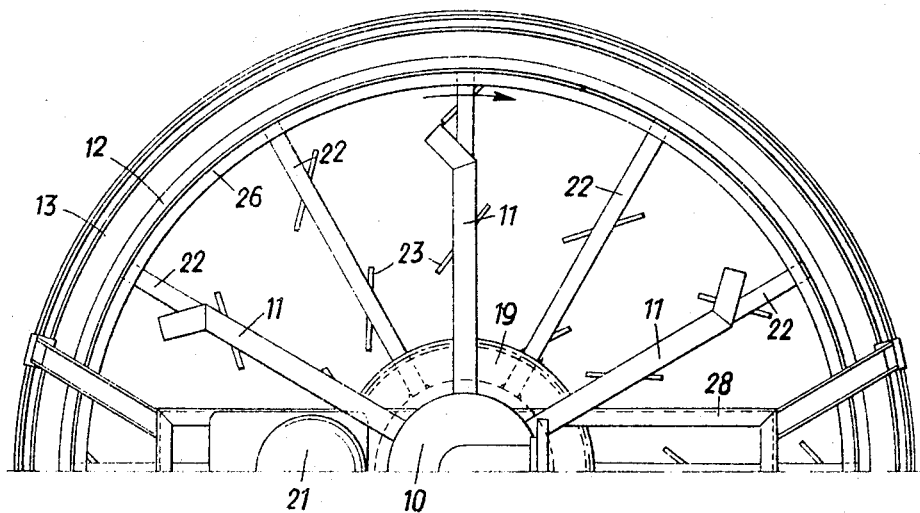

The above and other objects, advantages and features of the present invention will become more apparent from the following detailed description of a specific embodiment thereof, taken in conjunction with the accompanying drawing wherein FIG. 1 schematically illustrates the principles underlying this invention;

FIG. 2 is an elevational cross section of an apparatus embodying the principles shown in FIG. 1; and FIG. 3 is a top view of FIG. 2 showing one half of the apparatus, the other half being a symmetrical mirror image of the illustrated half.

Referring now to the drawing and first to FIG. 1, there is shown a plan view of a fixed conical support surface 1 whose base is in the plane of the drawing and whose apex is in a plane above that of the drawing. At the apex, the support surface 1 defines a concentrically arranged output opening 2. A plurality of entrainment elements constituted by shovel-like blades or vanes 3, 3a, 3b, 3c, 3d and 3e are arranged along spirals 4, only one such spiral arrangement being actually illustrated to simplify the drawing but another spiral being shown along which like entrainment means will be arranged in most practical embodiments of the apparatus. A bolt 5 mounts each entrainment means adjustably on a respective radial carrier arm 6 so that the angle $\beta$ of the entrainment means may be changed, i.e. the inclination of the entrainment blades in respect of the spiral may be varied. If desired, the mounting bolts may be arranged in an elongated slot in the carrier arms so that the radial position of the entrainment means may also be varied.

Means is provided for rotating the carrier arms with the entrainment means in the direction of the arrow, i.e. clockwise. Depending on the coarseness of the solid particles in the suspension, the entrainment blades are so adjusted that the lower edges thereof either form a small gap with the surface 1 or glide thereover in contact therewith in the case of very fine particles.

The slurry to be drained of liquid is indicated at 7 at the periphery of the base of the conical surface which forms a reservoir for the slurry and where a first entrainment means 3 entrains the suspension. It will be noted that the entrainment means are elements extending in a plane substantially perpendicular to the conical support surface and have a component enclosing the angle $\beta$ with the spiral, the illustrated means being flat blades enclosing the angle $\beta$ in their entirety although concave shovel-like elements may also be used, which have only one component enclosing this angle. Also, in the illustrated embodiment showing the principles underlying the invention, all the entrainment elements enclose the same angle with the spiral. In this arrangement, the slurry portion 7 is engaged by the slowly rotating first entrainment element 3 and moved radially inwardly a distance $a$ as the element continues to rotate clockwise in the direction of the arrow about the axis of the conical surface 1. It thus reaches the next annular path $a$ where it is engaged and entrained by the succeeding element 3a, moved further inwardly by the distance $a$, and so on until the last of the entrainment elements at the end of spiral 4 pushes the solid particles drained of liquid into the central output opening 2 whence the particles are discharged. Meanwhile, as the slurry is entrained upwardly and inwardly on the conical surface in a spiral path, the liquid runs down the surface by gravity, taking along any small suspended particles, such as clay in sand slurries. Additional spirals of entrainment means associated with the conical support surface operate analogously.

The width of the individual entrainment elements, their spacing from each other and the angle they enclose with the spiral will depend on the type of slurry to be drained. These parameters will take into consideration the fact that each entrained slurry portion will glide downwardly on the conical support surface in the time interval between being engaged by successive entrainment elements. The size of angle $\beta$ determines the width $a$. If this angle is too large, a portion of the slurry will simply be entrained in an annular path instead of being spirally moved upwardly, thus reducing the efficiency of the apparatus.

The apex angle of the conical support surface is relatively large but must be small enough so that the liquid is readily separated from the solid particles of the slurry by gravity as the slurry slowly moves up the slope of the surface in a spiral path. On the other hand, the angle of inclination must not be so small that the slurry rapidly rolls down the surface in the intervals when it is not engaged by the successive entrainment elements. The exact determination of the slope angle will be readily determinable in dependence on the nature of the slurry. Experience has shown that, for sand slurries and most other slurries which need to be drained in industrial processes, an apex angle of about 120° to 160° for the conical support surface is most effective.

As a matter of practicality, the construction of the apparatus is simplest if the conical support surface is fixed while the entrainment elements are rotated in respect thereto. However, in principle, only relative rotation between the entrainment means and the support surface is required to move the slurry spirally upwardly so that it would also be possible to hold the entrainment means fixedly and to rotate the conical surface relative thereto. Also, both could be rotated at different speeds to impart relative rotation between the entrainment means and the support surface. Furthermore, while a plurality of entrainment elements have been illustrated to constitute the entrainment means extending in a spiral path, these elements could be interconnected to form a continuous wall extending upwardly along the support surface in a spiral path. With such an entrainment means, the initial portion of the continuous spiral wall would have to form a gap with the support surface to permit the liquid drained from the slurry to run off.

Having described the principles of the structure and operation, a specific embodiment of the apparatus will now be described in conjunction with FIGS. 2 and 3.

The slurry to be drained, i.e. a slurry of sand in water wherein fine clay particles are also suspended, is delivered to the apparatus by a distributor 10 which has an annular delivery gutter whence a plurality of radially extending conduits 11 lead towards an annular gutter at the lower circumference of the conical support surface 12 to deliver the slurry into this annular gutter. The support surface 12 has a circular peripheral wall 13 which defines the annular gutter. An overflow rim 14 surrounds this gutter so that excess water from the slurry is immediately removed over the rim while the heavier sand settles in the gutter, the water level in the gutter being determined by the height of overflow rim 14.

The support frame 16 carries the hub 18 in friction-reducing bearings 17, reduction gearing 19, 20 connecting the hub to drive motor 21 for rotation of the hub. Carrier arms 22 are fixedly attached to hub 18 and extend radially therefrom for rotation therewith, the arms extending in a plane substantially parallel to the plane of the conical support surface so that they sweep over this surface during rotation. Successive ones of the carrier arms 22 carry the successive entrainment elements 23 arranged in spiral paths. The initial portion of each spirally extending entrainment means, i.e. the first entrainment element in each spiral at the bottom of the conical support surface, extends into the reservoir defined by the annular gutter so as to entrain successive portions of the slurry during rotation. As previously described, the slurry is then moved upwardly along a spiral path to the centrally and concentrically positioned output opening 24 which receives the dried solid particles and discharges them from the support surface at the end of the spiral path.

As shown, the outer ends of the radial carrier arms 22 are interconnected by a bracing ring 26, the entire structure is further braced by elements 28 and is supported on pedestals 29. The bearings 17 are mounted on the frame 16 by radially extending beams 27.

The illustrated embodiment has the advantage of the slurry distribution, delivery and discharge being arranged coaxially, with the delivery gutter, the reservoir and the output opening being concentric about the axis of the conical support surface.

An apparatus of this type may be used for draining all types of suspensions of solid particles in a liquid. The size of the particles in such slurries may range anywhere from about 200 microns to 5-7 mm, mixtures of various particle sizes in the same slurry being possible. If desired, a vibratory sieve may be mounted in the output opening to assist in further drainage of residual liquid. Also, if desired, baffle plates may be mounted at the discharge ends of the conduits 11 for directing the slurry suitably into the annular reservoir at the bottom of the conical support surface.

We claim:

1. An apparatus for draining liquid from a suspension of solid particles in said liquid to obtain dried solid particles, comprising
   1. an annular reservoir containing said suspension;
   2. a substantially conical support surface for said suspension,
      a. the annular reservoir concentrically surrounding the conical support surface and being in communication therewith, and
      b. The support surface sloping upwardly and inwardly out of the reservoir;
   3. entrainment means for the suspension having a supporting means near the center of the conical support surface and arranged along a spiral and in contact association with the conical support surface,
      a. an initial entrainment element of said entrainment means extending into the reservoir;
   4. means for imparting relative rotation between the entrainment means and the conical support surface,
      a. the entrainment means being so positioned that the rotation will cause the solid particles of the suspension to be entrained from the reservoir and upwardly therefrom by the entrainment means along the spiral while the liquid runs downwardly by gravity over the sloping support surface; and
   5. an output opening at an upper end of the spiral to receive and discharge the dried solid particles from the conical support surface.

2. The apparatus of claim 1, wherein the entrainment means comprises a plurality of successive entrainment elements, and further comprising a corresponding plurality of carrier arms supporting the plurality of entrainment elements, the rotating means being arranged to sweep the carrier arms over the conical support surface.

3. The apparatus of claim 2, wherein the entrainment elements are shovel-like blades and two successive ones of said spirals of entrainment means are associated with the conical support surface.

4. The apparatus of claim 2, further comprising means for adjusting the entrainment elements about an axis substantially perpendicular to the conical support surface.

5. The apparatus of claim 2, wherein said reservoir is an annular gutter at the lower circumference of the conical support surface, said gutter having an outer overflow rim.

6. The apparatus of claim 5, further comprising an annular delivery gutter positioned above and concentrical to the annular reservoir gutter, distributing means for supplying the suspension to the delivery gutter, and conduit means for moving the suspension from the delivery to the reservoir gutter.

7. The apparatus of claim 6, wherein the output opening and the distributing means are coaxially superimposed.

8. The apparatus of claim 5, further comprising a corresponding plurality of carrier arms supporting the plurality of entrainment elements, and said rotating means including a hub concentric with the conical support surface, the carrier arms extending substantially radially from the hub and being fixed thereto, and drive means connected to the hub for rotating the same.

9. The apparatus of claim 1, wherein the entrainment means comprises elements extending in a plane substantially perpendicular to the conical support surface and having a component enclosing an angle with the spiral.

10. The apparatus of claim 9, wherein all the entrainment elements along the spiral enclose the same angle therewith.

* * * * *